United States Patent
Lee

(10) Patent No.: US 11,344,986 B2
(45) Date of Patent: May 31, 2022

(54) TOOL SPINDLE AND MACHINE TOOL INCLUDING SAME

(71) Applicant: DOOSAN MACHINE TOOLS CO., LTD., Changwon-si (KR)

(72) Inventor: Chang-ho Lee, Changwon-si (KR)

(73) Assignee: DOOSAN MACHINE TOOLS CO., LTD., Changwon-si (KR)

( * ) Notice: Subject to any disclaimer, the term of this patent is extended or adjusted under 35 U.S.C. 154(b) by 307 days.

(21) Appl. No.: 16/341,629

(22) PCT Filed: Sep. 26, 2017

(86) PCT No.: PCT/KR2017/010610
§ 371 (c)(1),
(2) Date: Apr. 12, 2019

(87) PCT Pub. No.: WO2018/070698
PCT Pub. Date: Apr. 19, 2018

(65) Prior Publication Data
US 2021/0129278 A1 May 6, 2021

(30) Foreign Application Priority Data

Oct. 12, 2016 (KR) .......................... 10-2016-0131928

(51) Int. Cl.
*B23Q 11/00* (2006.01)
*B23Q 5/04* (2006.01)
(Continued)

(52) U.S. Cl.
CPC ............ *B23Q 11/0035* (2013.01); *B23Q 5/04* (2013.01); *B23Q 5/58* (2013.01); *B23C 1/12* (2013.01);
(Continued)

(58) Field of Classification Search
CPC ... Y10T 409/304312; B23C 1/14; B23C 1/12; B23Q 2220/004; B23Q 2220/006;
(Continued)

(56) References Cited

U.S. PATENT DOCUMENTS 3,230,831 A * 1/1966 Harker ............... B23Q 11/0032
409/141
3,522,864 A * 8/1970 Richter ............... B23Q 1/0063
188/380
(Continued)

FOREIGN PATENT DOCUMENTS

JP 02-116437 A * 5/1990
JP 2000-126953 A * 5/2000
(Continued)

OTHER PUBLICATIONS

Machine Translation of JP 02-116437-A, which JP '437 was published on May 1990.*
Machine Translation of JP 2000-126953-A, which JP '953 was published May 2000.*
International Search Report for PCT/KR2017/010610 dated Jan. 9, 2018.

*Primary Examiner* — Erica E Cadugan
(74) *Attorney, Agent, or Firm* — STIP Law Group, LLC

(57) ABSTRACT

A tool spindle for machine tool includes a tool spindle having a front end in which a tool is mounted and installed to be rotatable, and a vibration damping device mounted in a rear end of the tool spindle to damp cutting vibration generated at the front end of the tool spindle, and including a rigid member coupled to the rear end of the tool spindle and a tuned mass member elastically supported by the rigid member.

7 Claims, 10 Drawing Sheets

(51) Int. Cl.
*B23Q 5/58* (2006.01)
*B23C 1/14* (2006.01)
*B23Q 1/62* (2006.01)
*B23C 1/12* (2006.01)

(52) U.S. Cl.
CPC ............... *B23C 1/14* (2013.01); *B23Q 1/623* (2013.01); *B23Q 2220/004* (2013.01); *B23Q 2220/006* (2013.01); *Y10T 409/304312* (2015.01); *Y10T 409/305656* (2015.01); *Y10T 409/307672* (2015.01); *Y10T 409/309352* (2015.01)

(58) Field of Classification Search
CPC .... B23Q 1/623; B23Q 1/626; B23Q 11/0035; F16F 7/112
USPC .......................................................... 409/141
See application file for complete search history.

(56) References Cited

U.S. PATENT DOCUMENTS

| | | | |
|---|---|---|---|
| 6,719,503 B1* | 4/2004 | McCalmont | B23Q 11/0035 188/378 |
| 2007/0243033 A1* | 10/2007 | Hashimoto | B23Q 11/0035 409/141 |
| 2008/0178447 A1* | 7/2008 | Okada | B23Q 39/024 29/27 C |

FOREIGN PATENT DOCUMENTS

| | | |
|---|---|---|
| JP | 2008-062305 A | 3/2008 |
| JP | 2012-152894 A | 8/2012 |
| KR | 10-2007-0099437 A | 10/2007 |
| KR | 10-2012-0084907 A | 7/2012 |
| KR | 10-2013-0003541 A | 1/2013 |

* cited by examiner

TOOL SPINDLE AND MACHINE TOOL INCLUDING SAME

CROSS REFERENCE TO RELATED APPLICATION

This present invention is a national stage filing under 35 U.S.C. § 371 of PCT application number PCT/KR2017/010610 filed on Sep. 26, 2017 which is based upon and claims the benefit of priority to Korean Patent Application No. 10-2016-0131928 filed on Oct. 12, 2016 in the Korean Intellectual Property Office.

TECHNICAL FIELD

The present invention relates to a tool spindle and a machine tool including the same. More particularly, the present invention relates to a B axis rotatable tool spindle and 5 axis vertical machining center including the same.

BACKGROUND ART

A multi-tasking machine tool may include a tool spindle provided to be rotatable about B axis. The B axis tool spindle may be installed to be rotatable by a rotating mechanism of a B axis indexing device. However, the rotating mechanism engaged with the tool spindle has a relatively low stiffness structure, vibration may occur in a front end of the tool spindle, thereby deteriorating cutting performance.

DISCLOSURE OF THE INVENTION

Problems to be Solved

An object of the present invention provides a tool spindle capable of reducing vibration to improve cutting ability and increasing a vibration damping ability in a cutting frequency region.

Another object of the present invention provides a machine tool including the tool spindle.

Means to Solve the Problems

According to example embodiments, a tool spindle for machine tool includes a tool spindle having a front end in which a tool is mounted and installed to be rotatable, and a vibration damping device mounted in a rear end of the tool spindle to damp cutting vibration generated at the front end of the tool spindle, and including a rigid member coupled to the rear end of the tool spindle and a tuned mass member elastically supported by the rigid member.

In example embodiments, the rigid member may include a plurality of stiffness rods which extend backwardly from the rear end of the tool spindle.

In example embodiments, the vibration damping device may further include an additional mass member which is received within a recessing recess of the tuned mass member to be movable.

In example embodiments, the vibration damping device may include a viscous fluid which fills at least partially the receiving recess.

According to example embodiments, a machine tool includes a column installed in a rear side of a bed to be movable in X axis direction and Y axis direction, a spindle housing 40 installed in the column to be movable in Z axis direction, a B axis indexing device installed in the spindle housing, a tool spindle installed in the B axis indexing device to be rotatable about B axis and having a front end in which a tool is mounted, and a vibration damping device mounted in a rear end of the tool spindle to damp cutting vibration generated at the front end of the tool spindle.

In example embodiments, the machine tool further includes a rotary table installed in a front side of the bed to be rotatable about C axis and on which a workpiece is supported.

In example embodiments, the vibration damping device may include a rigid member coupled to the rear end of the tool spindle and a tuned mass member elastically supported by the rigid member.

In example embodiments, the rigid member may include a plurality of stiffness rods which extend away from the rear end of the tool spindle.

In example embodiments, the vibration damping device may further include an additional mass member which is received within a recessing recess of the tuned mass member to be movable.

Effects of the Invention

According to example embodiments, a tool spindle for machine tool may include a vibration damping device installed in a rear end of a tool spindle. The vibration damping device may reduce vibration generated in a front end of the tool spindle. The vibration damping device may adjust a natural frequency of the tool spindle to thereby improve a vibration damping ability in a cutting frequency region.

Thus, the vibration in the front end of the tool spindle may be reduced to thereby increase dynamic stiffness of the tool spindle and improve cutting ability.

However, the effect of the invention may not be limited thereto, and may be expanded without being deviated from the concept and the scope of the present invention.

BEST MODE FOR CARRYING OUT THE INVENTION

Figure 1:
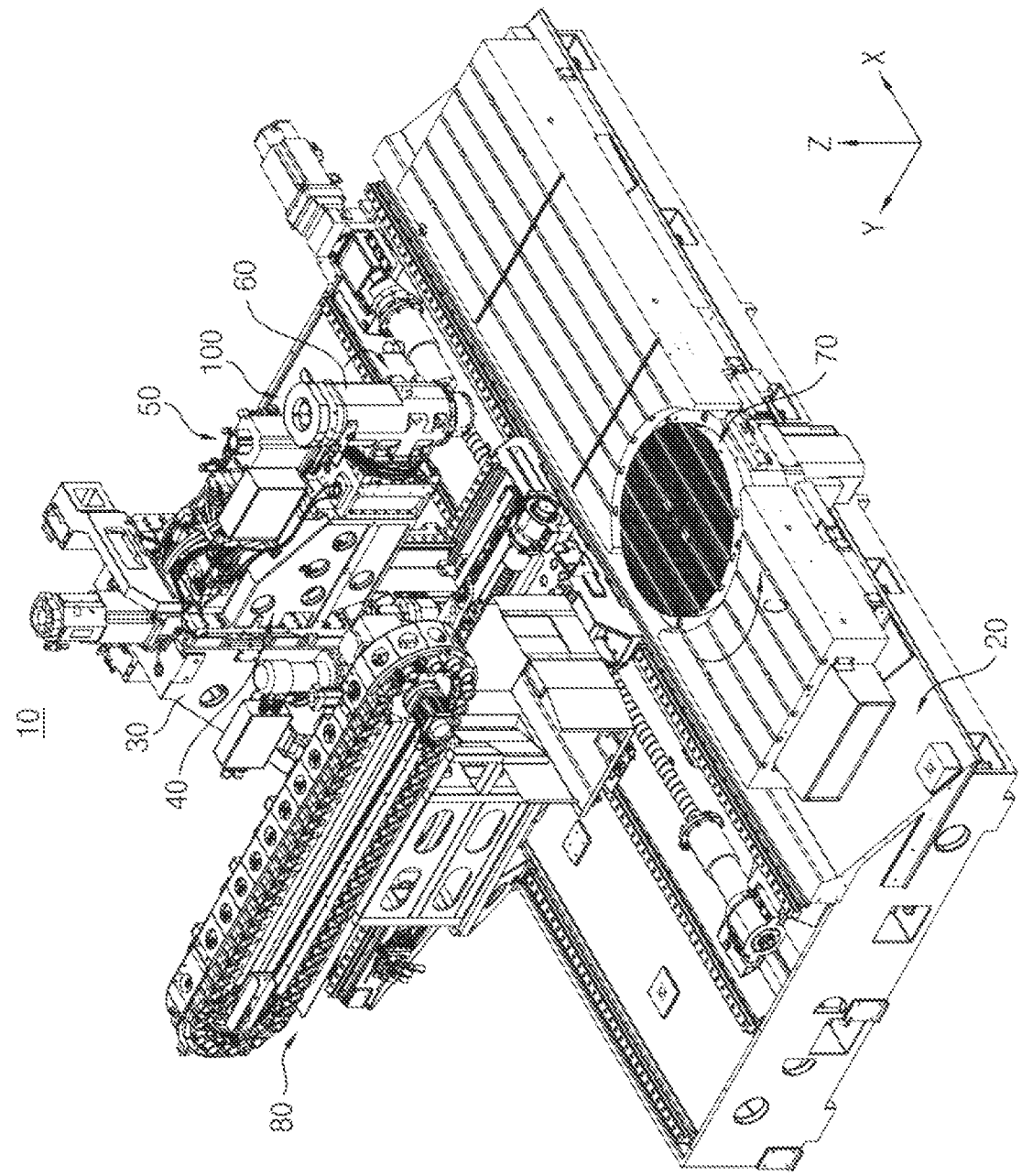
FIG. 1 is a perspective view illustrating a machine tool in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
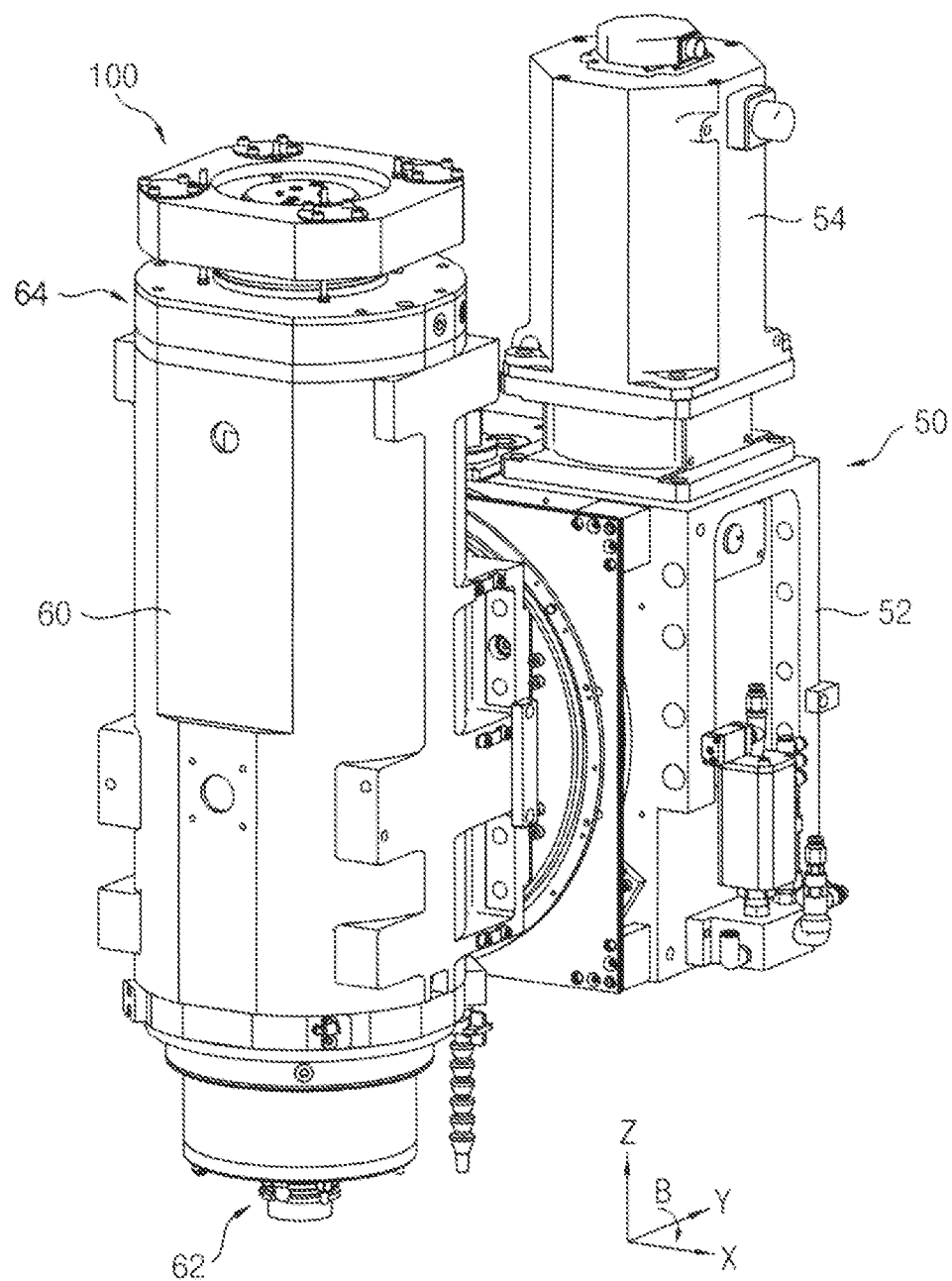
FIG. 2 is a perspective view illustrating a tool spindle in FIG. 1.
Figure 3:
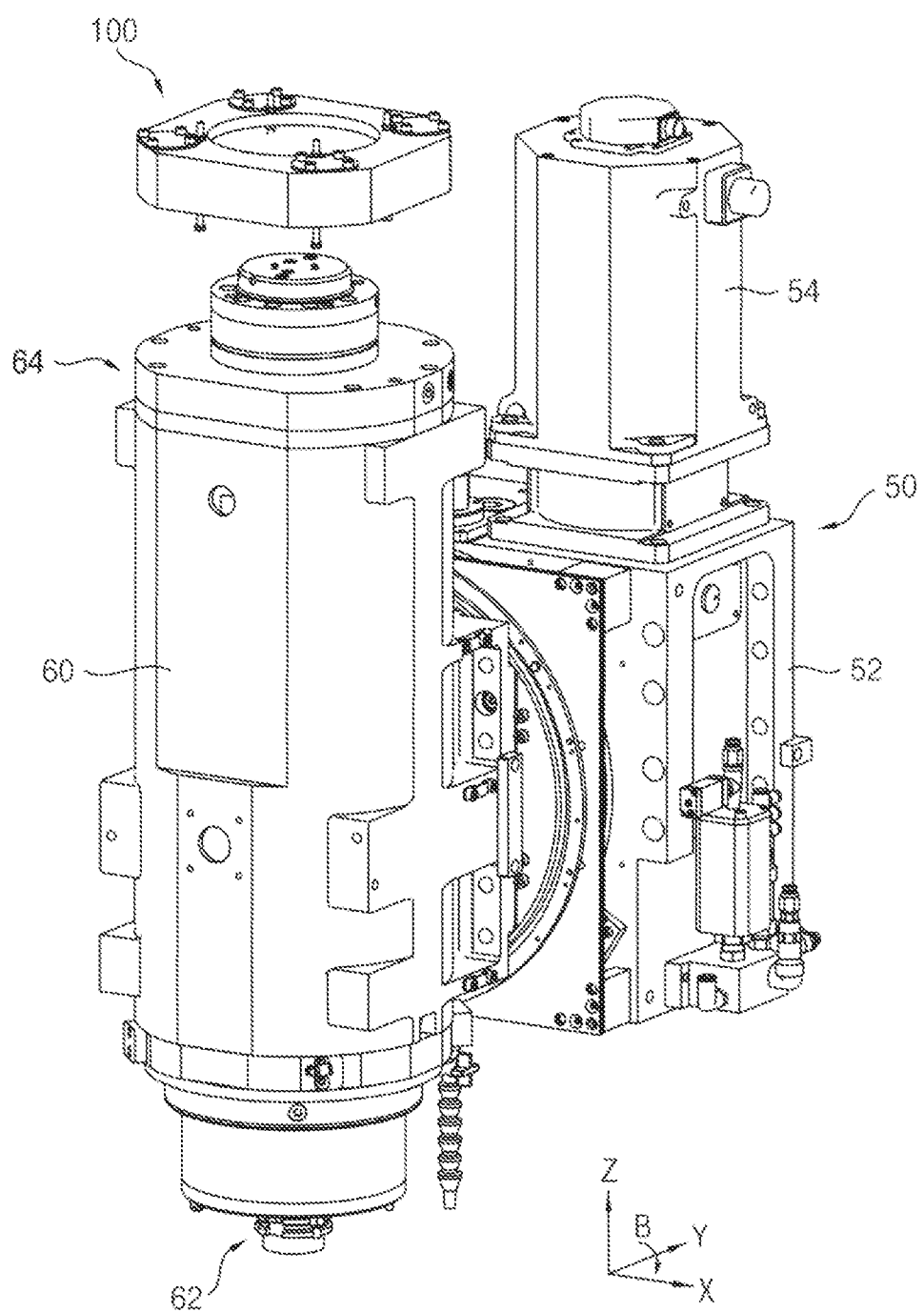
FIG. 3 is an exploded perspective view illustrating an assembled state of a vibration damping device in the tool spindle in FIG. 2.
Figure 4:
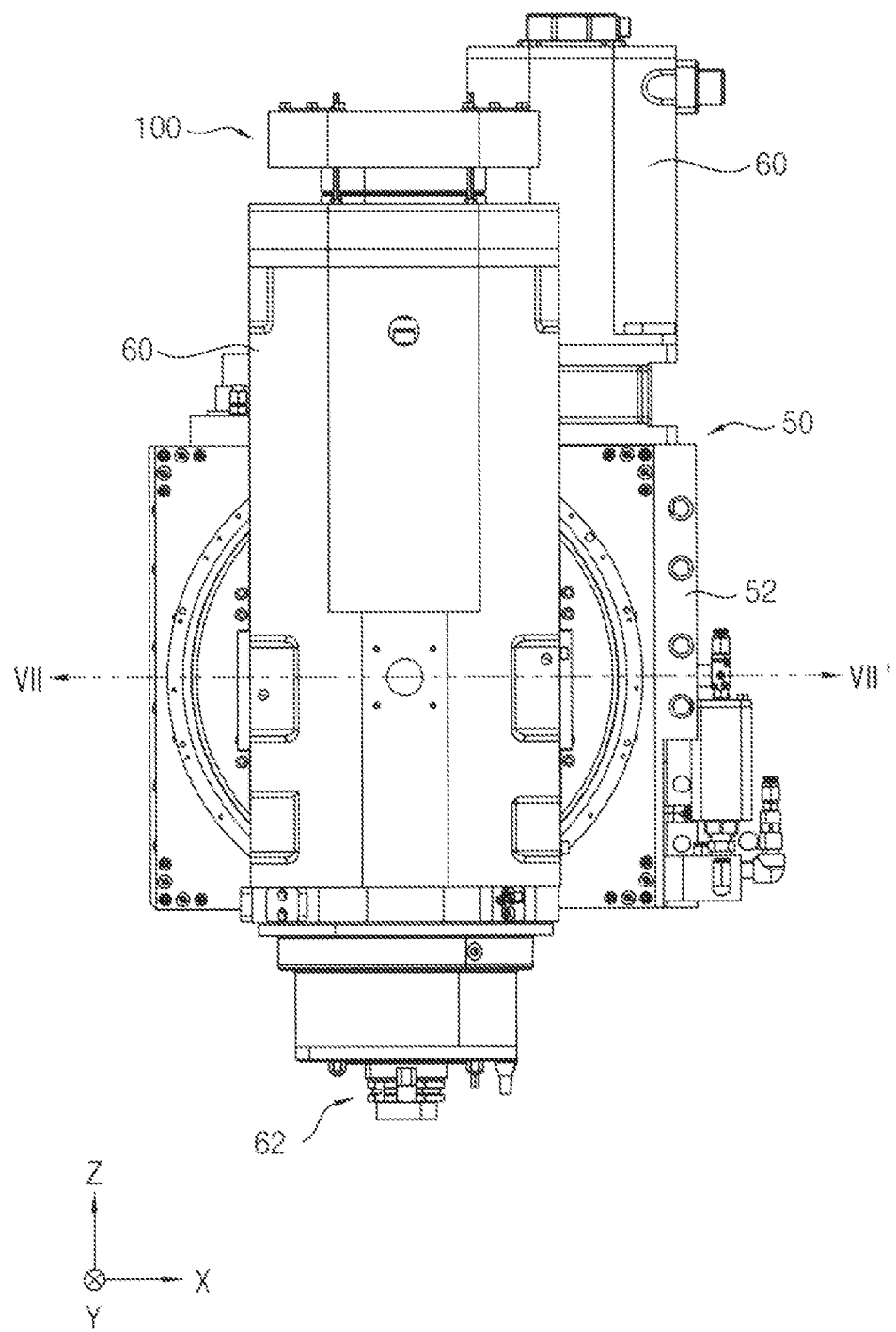
FIG. 4 is a front view illustrating the tool spindle in FIG. 2.
Figure 5:
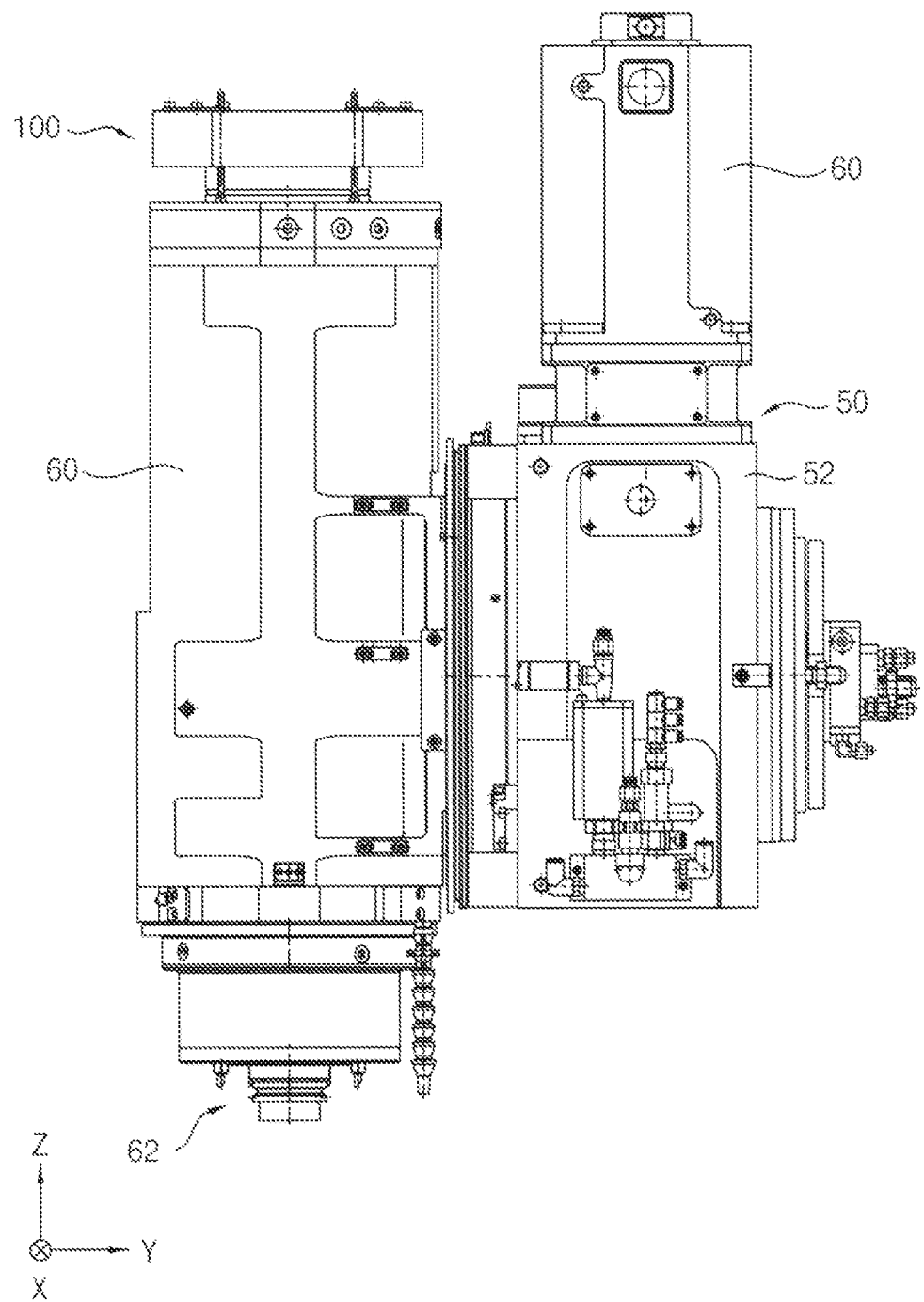
FIG. 5 is a right side view illustrating the tool spindle in FIG. 2.
Figure 6:
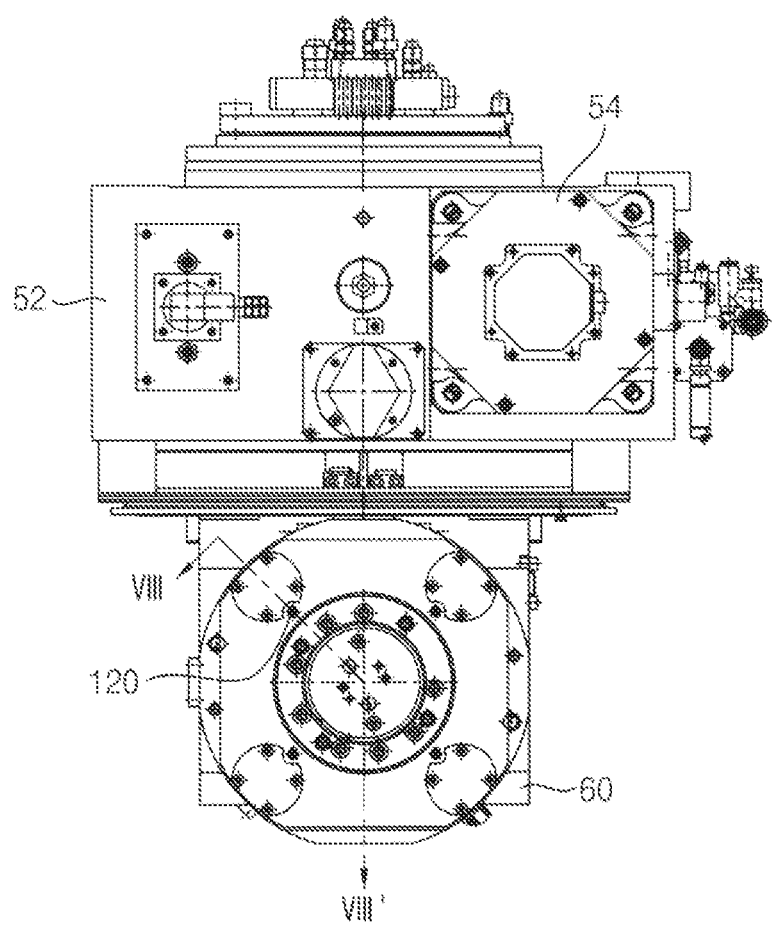
FIG. 6 is a plan view illustrating the tool spindle in FIG. 2.
Figure 7:
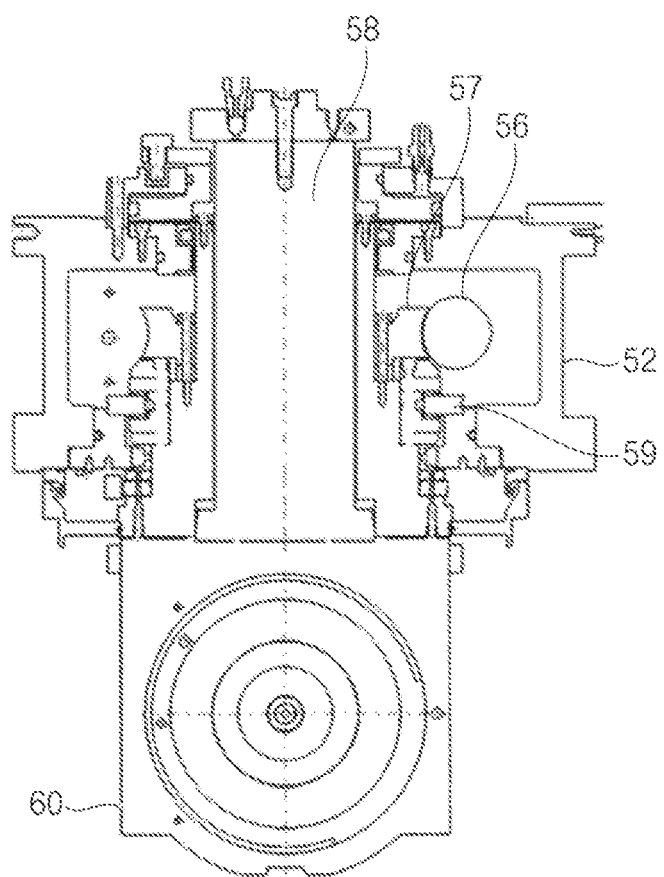
FIG. 7 is a cross-sectional view taken along the line VII-VII' in FIG. 4.
Figure 8:
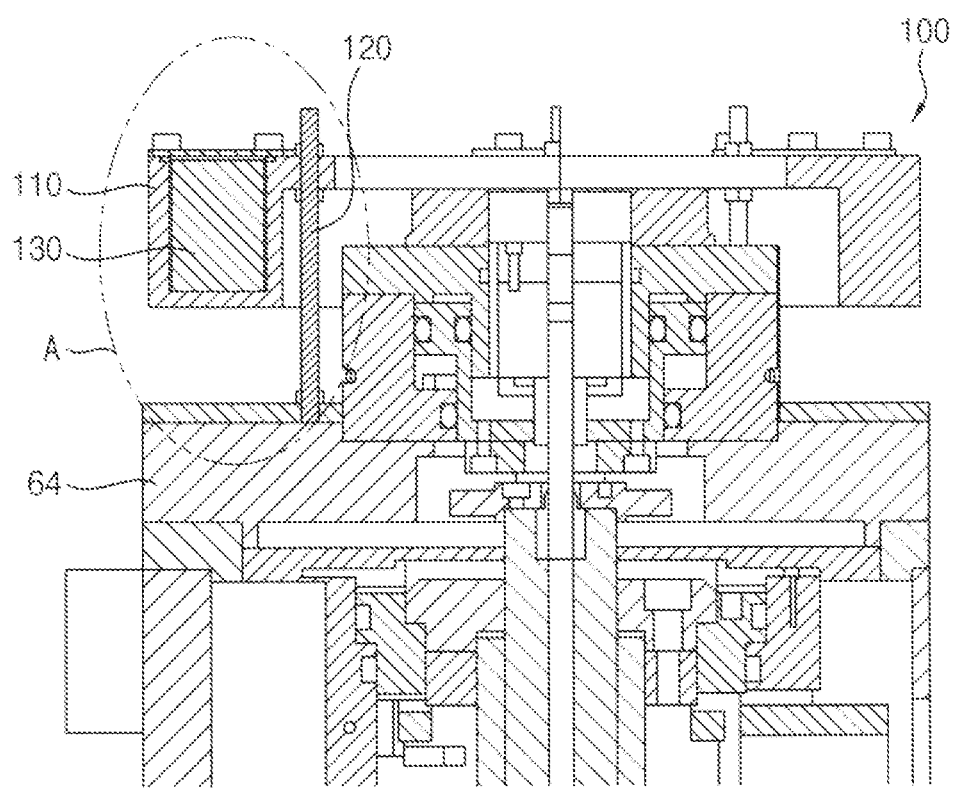
FIG. 8 is a cross-sectional view taken along the line VIII-VIII' in FIG. 6.
Figure 9:
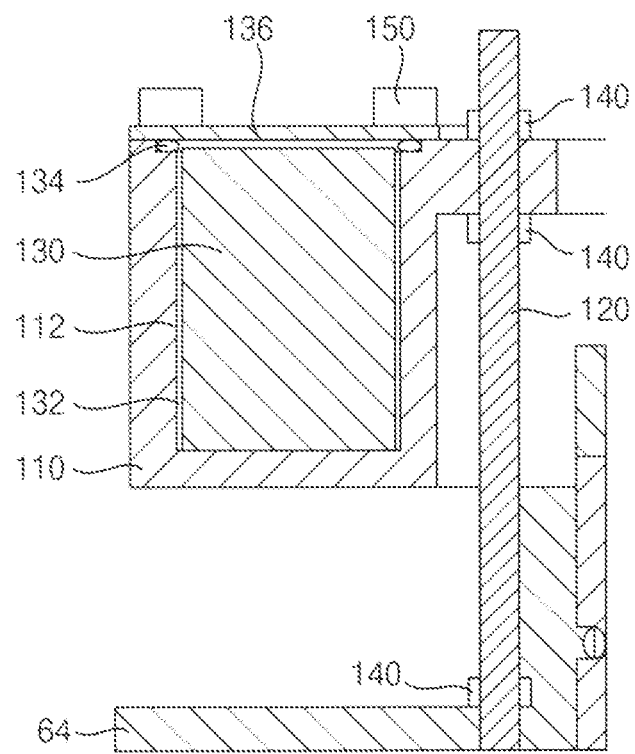
FIG. 9 is an enlarged view illustrating "A" portion in FIG. 8.

FIG. 1 is a perspective view illustrating a machine tool in accordance with example embodiments. FIG. 2 is a perspective view illustrating a tool spindle in FIG. 1. FIG. 3 is an exploded perspective view illustrating an assembled state of a vibration damping device in the tool spindle in FIG. 2. FIG. 4 is a front view illustrating the tool spindle in FIG. 2. FIG. 5 is a right side view illustrating the tool spindle in FIG. 2. FIG. 6 is a plan view illustrating the tool spindle in FIG. 2. FIG. 7 is a cross-sectional view taken along the line VII-VII' in FIG. 4. FIG. 8 is a cross-sectional view taken along the line VIII-VIII' in FIG. 6. FIG. 9 is an enlarged view illustrating "A" portion in FIG. 8.

Referring to FIGS. 1 to 9, a machine tool 10 may include a tool spindle 60 rotatable about B axis and having a front end in which a tool is mounted and a vibration damping device 100 mounted in a rear end of the tool spindle 60 to damp a cutting vibration generated in the tool spindle 60.

In example embodiments, the machine tool 10 may be 5 axis vertical machining center having three feed axes (X, Y, Z) and two rotating axes (B, C).

In particular, the machine tool 10 may include a column 30 installed in a rear side of a bed 20 to be movable in X axis direction and Y axis direction, a spindle housing 40 movable in a vertical direction (Z axis direction) along a rail guide installed in the column 30, a B axis indexing device 50 installed in the spindle housing 40, a tool spindle 60 installed in the B axis indexing device 50 to be rotatable about B axis, that is, in a direction rotating around Y axis and having a front end in which the tool is mounted and a read end in which the vibration damping device 100 is mounted, and a rotary table 70 installed in a front side of the bed 20 to be rotatable about C axis, that is, in a direction rotating around Z axis and on which a workpiece is supported. Additionally, the machine tool 10 may include a tool magazine 80 installed in the rear side of the bed 20 and configured to change and supply a plurality of the tools.

In example embodiments, the tool spindle 60 may be installed in a front side of a body 52 of the B axis indexing device 50 and may be connected to a B axis shaft 58 within the body 52 to rotate about X axis. A cutting tool may be mounted in the front end 62 of the tool spindle 60. The vibration damping device 100 may be mounted in the rear end 64 of the tool spindle 60 opposite to the front end 62. The vibration damping device 100 may serve as a tuned mass damper (TMD) to damp the cutting vibration generated in the tool spindle 60.

The tool spindle 60 may be installed to be rotatable by the B axis indexing device 50 as a spindle pivot device. As illustrated in FIG. 7, the tool spindle 60 may be connected to the B axis shaft 58 to rotate about B axis. In particular, the B axis indexing device 50 may include a rotating mechanism provided in the body 52 to transmit a driving torque from a servo motor 54 to the tool spindle 60. The rotating mechanism may include a worm shaft 56 and a worm wheel 57 mounted within the body 52. The worm shaft 56 may be rotated by a driving shaft of the servo motor 54 through a gear mechanism, and the worm wheel 57 engaged with the worm shaft 56 may rotate the B axis shaft 58, which is supported by a support bearing 59, about B axis.

The front end 62 of the tool spindle 60 may be combined with a rotating shaft of a spindle to rotate at a desired cutting speed, in order to cut the workpiece. The tool mounted in the front end 62 of the tool spindle 60 may generate a cutting force for machining, and the cutting force may vibrate the machine tool including the tool spindle 60. In here, the vibration damping device 100 may damp the vibration which may occur in the front end 62 of the tool spindle 60 due to a relatively weak stiffness of the rotating mechanism between the body 52 of the B axis indexing device 50 and the tool spindle 60.

In example embodiments, the vibration damping device 100 may be installed in the rear end 64 of the tool spindle 60 to reduce the vibration generated in the front end 62 of the tool spindle 60. The vibration damping device 100 may reduce the vibration in the B axis rotating movement and tilting movement of the tool spindle 60.

In particular, the vibration damping device 100 may include a rigid member 120 coupled to the rear end 64 of the tool spindle 60 and a tuned mass member 110 elastically supported in the rear end of the tool spindle 60 by the rigid member 120. Additionally, the vibration damping device 100 may further include an additional mass member 130 installed in the tuned mass member 110 to be movable.

For example, the rigid member 120 may include a stiffness rod. Four stiffness rods may be installed in the rear end 64 of the tool spindle 60 respectively, and may extend backwardly from the rear end. It may be understood that the number of the stiffness rods may not be limited thereto.

The tuned mass member 110 may be supported by the stiffness rods to be spaced apart from the rear end of the tool spindle 60 by a predetermined distance. The stiffness rod may be fastened to the rear end 64 of the tool spindle 60 and the tuned mass member 110 respectively by fastening screws 140. A natural frequency of the tool spindle 60 may be adjusted by varying lengths of the stiffness rods. Here, the natural frequency may be defined by a following equation (1).

$$f_n = \sqrt{K/M} \qquad \text{Equation (1)}$$

Here, fn is a natural frequency, K is a stiffness, and M is a mass.

In the adjustment (tuning) of the natural frequency, the length of the stiffness may be adjusted to change the stiffness (K), and the mass (M) of the tunes mass member 110 may be adjusted to change the mass (M). The tuned mass member 110 may vibrate with a phase opposite to the vibration of the tool spindle 60, to thereby reduce the vibration in the front end 62 of the tool spindle 60.

The additional mass member 130 may be received within a receiving recess 112 of the tuned mass member 110 to be movable. The receiving recess 112 may extend from an outer surface of the tuned mass member 110 into a predetermined depth. The additional mass member 130 may be disposed within the receiving recess 112 to be spaced apart from an inner surface of the receiving recess 112 by a distance of about 0.5 mm to about 1.0 mm. The spacing distance between the additional mass member 130 and the inner surface of the receiving recess 112 may not be limited thereto.

The space between the additional mass member 130 and the inner surface of the receiving recess 112 may be filled with a viscous fluid 132 such as oil at a certain level. A sealing cap 136 may seal hermetically the receiving recess 112 with an O-ring 134 interposed therebetween. The sealing cap 136 may be combined with the outer surface of the tune mass member 110 by fastening bolts 150 to cover the receiving recess 112. The additional mass member 130 may collide with the inner surface of the receiving recess 112 to improve a vibration damping ability.

Figure 10A:
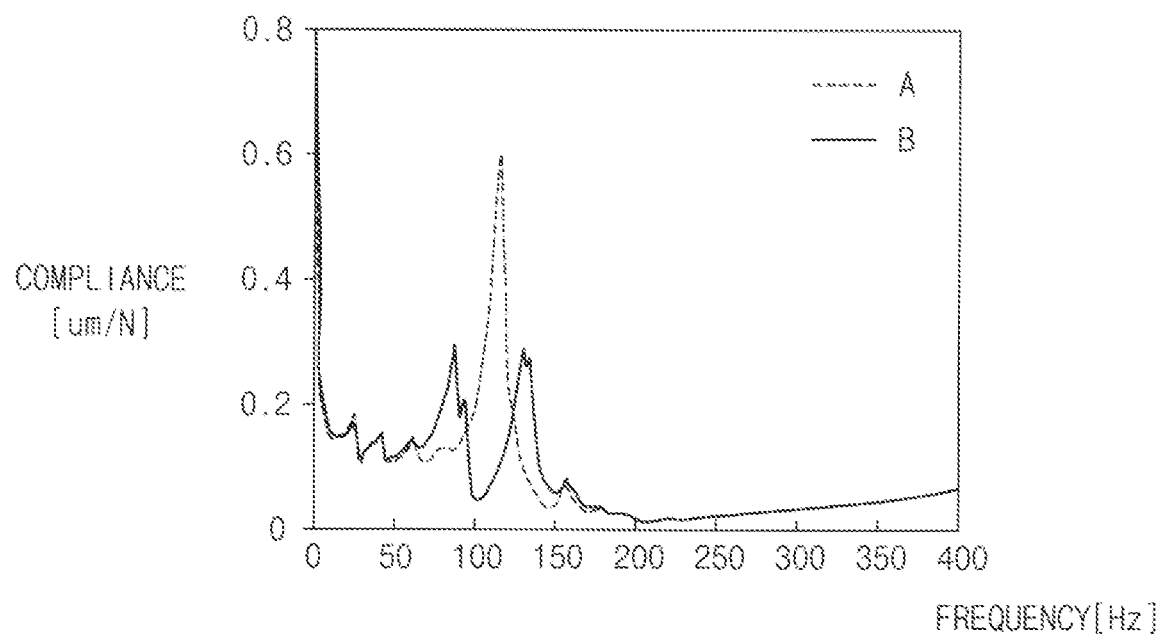
FIGS. 10A and 10B are graphs illustrating X direction and Y direction frequency response curves in a distal end of a tool before and after the vibration damping device is attached.
Figure 10B:
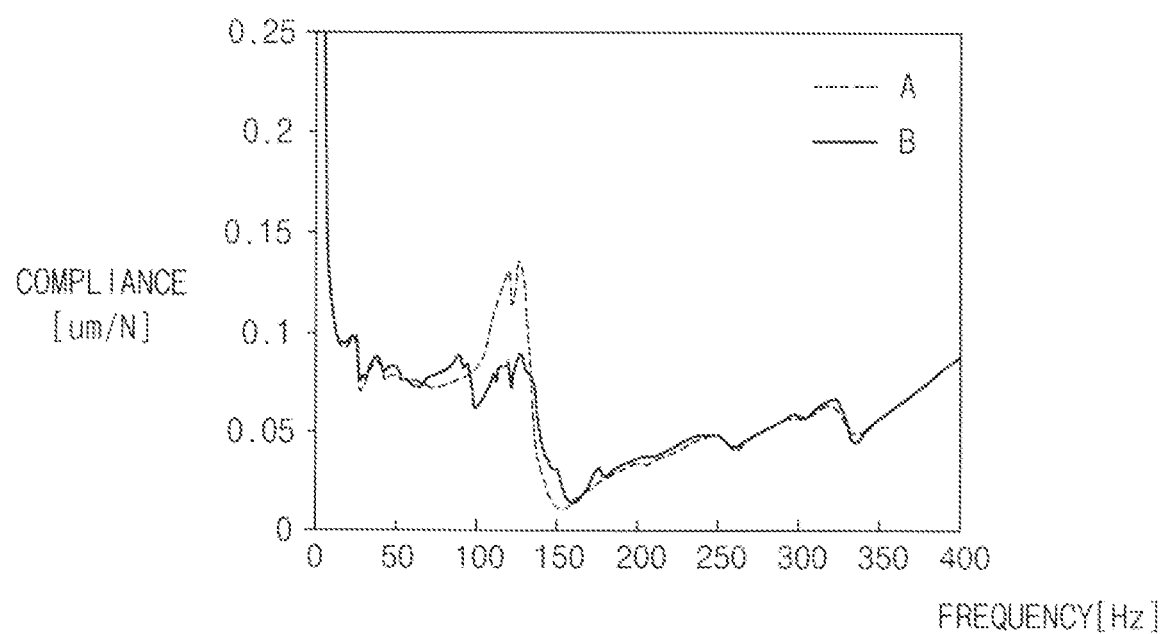

FIGS. 10A and 10B are graphs illustrating X axis direction and Y axis direction frequency response curves in a distal end of a tool before and after the vibration damping device is attached. FIG. 10A represents compliance (reciprocal of dynamic stiffness) at a given frequency in a rotating vibration mode (X axis direction vibration mode) at the distal end of the tool, and FIG. 10B represents compliance at a given frequency in a tilting vibration mode (Y axis direction vibration mode) at the distal end of the tool.

Referring to FIGS. 10A and 10B, X axis direction dynamic stiffness of a tool spindle B with a vibration damping device attached thereto may be increased more than twice than that of a tool spindle A without the vibration damping device, and Y axis direction dynamic stiffness of the tool spindle B with the vibration damping device may be increase more than 1.5 times than the tool spindle A without the vibration damping device. As the dynamic stiffness of the tool spindle with the vibration damping device is increased, a maximum stable depth of cut may be increased to thereby provide high machining productivity.

As mentioned above, the vibration damping device 100 may be installed in the rear end of the tool spindle 60. The vibration damping device 100 may reduce the vibration generated in the front end 62 of the tool spindle 60. The vibration damping device 100 may reduce the vibration in the B axis rotating movement and tilting movement of the tool spindle 60. The vibration damping device 100 may adjust the natural frequency of the tool spindle 60 to thereby improve the vibration damping ability in a cutting frequency region.

Thus, the vibration in the front end of the tool spindle 60 may be reduced to thereby increase dynamic stiffness of the tool spindle 60 and improve cutting ability.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: machine tool 20: bed
30: column 40: spindle housing
50: B axis indexing device 52: body
54: servo motor 56: worm shaft
57: worm wheel 58: B axis shaft
59: support bearing 60: tool spindle
70: rotary table 80: tool magazine
100: vibration damping device 110: tuned mass member
112: receiving recess 120: rigid member
130: additional mass member 132: viscous fluid
134: O-ring 136: sealing cap
140: fastening screw 150: fastening bolt

The invention claimed is:

1. A machine tool, comprising:
a column installed in a first side of a bed to be movable in an X axis direction and a Y axis direction;
a spindle housing installed on the column to be movable in a Z axis direction;
a B axis indexing device installed on the spindle housing;
a tool spindle installed on the B axis indexing device to be rotatable about a B axis, wherein a tool is mounted to a first end of the tool spindle; and
a vibration damping device mounted to a second end of the tool spindle to damp cutting vibration generated at the first end of the tool spindle, wherein the first end of the tool spindle and the second end of the spindle are opposite to each other,
wherein the vibration damping device comprises:
at least one rigid member coupled to the second end of the tool spindle;
a tuned mass member supported by the at least one rigid member; and
an additional mass member received within a receiving recess of the tuned mass member to be movable therein, wherein
the at least one rigid member comprises a plurality of rigid members, wherein each of the rigid members comprises a respective stiffness rod that extends away from the second end of the tool spindle and that is outside of the receiving recess,
the tuned mass member is supported by the plurality of stiffness rods to be spaced apart from the second end of the tool spindle by a predetermined distance,
the receiving recess extends from an outer surface of the tuned mass member into the tuned mass member by a predetermined depth, and
a sealing cap is fastened to the outer surface of the tuned mass member to cover the receiving recess.

2. The machine tool of claim 1, further comprising:
a rotary table installed in a second side of the bed to be rotatable about a C axis and on which a workpiece is supported, wherein the first side of the bed and the second side of the bed are opposite to each other.

3. The machine tool of claim 1, wherein the additional mass member received within the receiving recess of the tuned mass member is spaced apart from an inner surface of the receiving recess.

4. The machine tool of claim 3, wherein space between the inner surface of the receiving recess and the additional mass member is filled with a viscous fluid.

5. The machine tool of claim 1, further comprising: a tool magazine installed in the first side of the bed and configured to change and supply a plurality of tools.

6. The machine tool of claim 1, wherein the plurality of stiffness rods is fastened to the second end of the tool spindle and to the tuned mass member by fastening screws.

7. The machine tool of claim 1, wherein the plurality of stiffness rods comprises four stiffness rods.

* * * * *